United States Patent

Stettner et al.

[11] Patent Number: 6,057,552
[45] Date of Patent: *May 2, 2000

[54] HIGH SPEED CRYSTALLOGRAPHY DETECTOR

[75] Inventors: Roger Stettner; Howard Bailey, both of Santa Barbara, Calif.

[73] Assignee: Advanced Scientific Concepts, Inc., Santa Barbara, Calif.

[*] Notice: This patent is subject to a terminal disclaimer.

[21] Appl. No.: 08/855,805

[22] Filed: May 12, 1997

Related U.S. Application Data

[63] Continuation of application No. 08/391,232, Feb. 21, 1995, Pat. No. 5,629,524.

[51] Int. Cl.⁷ ..................................................... G01T 1/24
[52] U.S. Cl. ........................... 250/370.09; 250/208.1; 250/370.08; 378/98.8
[58] Field of Search ........................ 250/370.08, 370.09, 250/580, 208.1; 378/98.8

[56] References Cited

U.S. PATENT DOCUMENTS

| | | | |
|---|---|---|---|
| 5,043,582 | 8/1991 | Cox et al. | 250/370.09 |
| 5,220,170 | 6/1993 | Cox et al. | 250/370.09 |
| 5,245,191 | 9/1993 | Barber et al. | 250/370.09 X |
| 5,629,524 | 5/1997 | Stettner et al. | 250/370.09 |

*Primary Examiner*—Constatine Hannaher
*Attorney, Agent, or Firm*—Gottlieb, Rackman and Reisman, P.C.

[57] ABSTRACT

A device for the collection, digitization and analysis of synchrotron x-ray crystallographic data using an area detector which detects x-ray photons directly on arrays of solid state detectors and stores the information on capacitors located on readout unit cell array chips. The device consists of a two dimensional area detector, for amplification, collection and conversion of the diffracted x-rays to electrical signals, drive electronics for providing the timing pulses and biases to the area sensor, output electronics for converting the x-ray signals to digital signals and storing the signals, and a data processor to analyze the digital signal form the output electronics. The solid-state detector array is made up of a variable-area three-dimensional array of detector array chips where each chip is in turn made up of an array of solid-state detectors. Each detector on the detector array chip is electrically connected to a readout unit cell on a readout array chip directly beneath the detector array chip. The readout unit cell contains the circuitry for storage, switching and readout of the x-ray signals.

30 Claims, 7 Drawing Sheets

HIGH SPEED CRYSTALLOGRAPHY DETECTOR

This is a continuation of application Ser. No. 08/391,232 filed Feb. 21, 1995, now U.S. Pat. No. 5,629,524.

BACKGROUND OF THE INVENTION

This invention relates to electronic apparatus for capturing and digitizing x-ray patterns. More particularly, it relates to apparatus for imaging the x-ray pattern resulting from the diffraction of x-rays by crystals.

X-ray diffraction patterns are useful in the analysis of molecular structures, such as protein and virus molecules. Protein and virus crystallography imposes stringent requirements on x-ray detectors, particularly where the x-ray source is high flux synchrotron radiation that enables an experiment to be done rapidly. Furthermore, an important and developing protein-crystallography field is time-resolved crystallography using synchrotrons. Monitoring a time-dependent reaction in a crystal can elucidate the time-dependent molecular changes that occur in a chemical reaction. High time resolution speed is often critical to such monitoring Film has traditionally been used in crystallographic analysis but now competes with storage phosphor (SP) imaging plates. Film has poor dynamic range and non-optimal sensitivity because of low stopping power, particularly for higher crystallographic x-ray energies. SP imaging plates have much greater dynamic range than film and are much more convenient to use because an SP laser readout leads directly to a digitized image. However, in spite of the greater SP stopping power, SP sensitivity is relatively as low as film because of photon losses in the readout system See E. F. Eikenberry, et al, "X-ray Detectors: Comparison of Film, Storage Phosphors and CCD detectors", Conference on Photoelectronic Image Devices, London, September, 1991, Section 3. Neither film nor SP imaging plates provide x-ray analysis in real time; they must first be removed from their apparatus before development or read out. Because of either their low stopping power or low x-ray quantum efficiency and long readout time, film and SP imaging plates perform poorly as synchrotron radiation detectors.

Some real time digitizing detectors for x-rays are known. Charge Coupled Device (CCD)-based detectors are superior to film and storage phosphor imaging plates in performance and convenience; however, they are limited by low signal-to-noise ratio, poor read out efficiency, limited effective temperatures of operation and poor time resolution compared to the present invention. Large-area, real-time, CCD-based digitizing detectors have been tested. See M. G. Strauss, et al., "CCD-based detector for protein crystallography with synchrotron X-rays", Nuclear Instruments and Methods in Physics Research A297 275–295, North Holland (1990). Such detectors use (1) a phosphor screen to detect the x-rays and convert one x-ray photon to many visible photons; (2) a fiber-optic and/or lens demagnifier to couple the phosphor screen to a charged coupled device (CCD) so that an area larger than the CCD can be used to collect x-rays; (3) an image intensifier to increase the detector gain by further increasing the number of visible photons for each x-ray; (4) a CCD which detects the visible photons converting them to an electrical signal; (5) a cryostat to cool the CCD and reduce its noise. The CCD also integrates the signal and reads the signal out for digitization.

More recently modular digitizing crystallography detectors have been proposed for synchrotron-source studies See FIG. 1 of S. M. Gruner et al, "Characterization of Polycrystalline Phosphors for Area X-ray Detectors", (July 1993), Proceedings of SPIE. These detectors do not include the image intensifier or lens demagnifiers; the fiber optics demagnifier is coupled directly to the CCD.

Large area detectors are desirable because they can collect a larger part of the crystallographic data; a high data redundancy is often advantageous in crystal analysis. Higher resolution requirements also lead to larger detector area requirements. Large detector area needs combined with small CCD size has necessitated the use of a fiber optic demagnifier and, in some detector designs, a lens demagnifier as well. This has led to a major shortcoming. Loss of more than 95% of the visible photons in making a direct transition from the phosphor to the CCD is common, resulting in low gain and, consequently, in a single-x-ray-photon signal which is well below the sensor noise and cannot be detected. The Detective Quantum Efficiency (DQE), and consequently the signal-to-noise ratio (S/N), for the collection of a few x-ray photons is very low. ($(S/N)^2=DQE \times N$, where N is the number of x-ray photons detected.) Attempts to design around this problem have resulted in the current CCD-based sensor designs.

(1) Where low flux signals are anticipated an image intensifier is required between the fiberoptic and the CCD to increase gain, increasing the signal above the noise. A weak link in low-signal detector designs is the image intensifier which, because of the low quantum efficiency of its photocathode or its large noise factor, results in a less than optimal DQE (about 50%–75%) and also causes inconvenient image distortion. Removing the image intensifier and directly coupling the fiber optics to the CCD (directly coupled detectors) requires a high-flux source to realize the benefits.

(2) Where high-flux synchrotron sources are available, the DQE, and thus the S/N, is increased by waiting to collect enough signal so that the signal dominates the internal noise. Intense sources will be effective in generating a high DQE, for signals of concern, as long as the detector meets certain minimum gain requirements and has a low internal noise. But the waiting times are excessive and preclude effective real time use. In addition, faint diffraction patterns may be undetected.

The CCD itself creates inherent time-resolution problems with the CCD-based detector designs resulting in considerable dead time when no light is being collected. Imaging CCD arrays are essentially slow readout devices with practical dynamic ranges of a few thousand This makes them poor choices for dynamic, Laue-diffraction crystallographic studies or for optimally-efficient data collection with synchrotron sources. When data is collected, a shutter allows light to fall on the CCD and visible-photon signals are integrated. The shutter turns the light off and terminates the integration period. Data is then sequentially read off the CCD array. The pixels cannot be reset individually for continuous data collection so a considerable dead time exists. Readout time recommended for the Tektronix 1024× 1024, 25 m pixel array is 20 $\mu$s/pixel; the maximum readout rate for the front-illuminated version of this CCD is about 1 $\mu$s/pixel. See Tektronix, "The Imaging CCD Array. Introduction and Operating Information; TK1024 CCD Imager", Technical note and Specifications, 1992 and 1991. However, increasing the readout speed above the recommended value results in increased noise. CCD-based detectors could, in principle, be used to obtain full-frame images with time resolution on the order of seconds. This is too slow for most high-flux sources and for most time resolved studies Alternatively, for time resolution studies, CCD-based detectors can be configured to collect a limited number of smaller-frame images: a restricted field-of-view causes phosphor light to fall on a small region of the CCD; pixels in this region are continuously clocked out of the light until all the pixels have been used. Thus, a number of small-frame images are stored and can be read out in the usual way. The problem with this method is the limited number of frames that can be stored and the limited number of pixels in a frame. The phosphor decay limits the use of the small-frame CCD method to a time resolution of about 1–10 ms. The CCD could be used to directly absorb the x-rays, but its area would be limited, due to the small CCD pixel size (about 25 $\mu$m). The limited detector lifetime, using this non-radiation-hard technology, is a very important issue. Additionally, since the CCD has only a thin active region with not much x-ray stopping power, the DQE would be low, particularly for higher energy x-rays. We note that low sensitivity, or low DQE for a small number of x-ray photons, would limit the use of directly-coupled CCD detectors in time-resolved crystallography An SP-based system to record time-resolved x-ray patterns is depicted in Amemiya, Y. et al, (1989), Review of Scientific Instruments 60, 7, 1552–6. Like film in a movie camera, storage phosphors are mechanically continually replaced. It takes about 0.2 seconds to replace an SP and the minimum exposure time is about 0.1 second via a mechanical x-ray shutter; am thus the time resolution is about 0.3 seconds. Because this is a mechanical system it is severely time-resolution limited.

Another mechanical device for obtaining time-resolved crystallographic images is a streak camera. See "Macromolecular Crystallography with Synchrotron Radiation", Helliwell, 1992, Cambridge, which discusses a rotating drum device in which x-rays, passing through a field-of-view-limiting slit, fall on an image plane (IP) located on the drum Time evolution of a crystal, in a narrow field-of-view, is continually recorded on different areas of the SP with a maximum time-resolution of 0.023 ms. The limitations of this system are the one dimensionality of the image and the relatively low time resolution.

Another imaging detector-array technology under development is amorphous silicon. This technology is not suitable for dynamic-Laue studies because it is used with phosphor screens (the detectors have little x-ray stopping power), because it is a monolithic-design (small area available for circuitry) and because thin-film transistor (TFT) readout technology that is employed is too slow and unsophisticated (switching a signal onto an output line is about all that can be expected).

BRIEF DESCRIPTION OF THE PRESENT INVENTION

The present invention comprises an area sensor for detecting x-rays diffracted from crystalline samples, drive electronics for providing timing pulses and biases to the area sensor, output electronics for converting the x-ray signals to digital signals and for storing the signals, and a data processor to analyze the digital signal from the output electronics.

The invention further comprises large sized area sensors, having two or three dimensional arrays of high signal-to-noise ratio hybrid chips where each hybrid is composed of a detector array and readout unit cell array chip. These hybrid arrays avoid cumbersome, low signal-to-noise ratio fiber optics, slow CCD readout arrays and lower than room temperature operation.

It is the object Of the present invention to provide a device for the collection, digitization and analysis of synchrotron x-ray crystallographic data and to overcome the problems of such prior systems associated with slow data collection, low signal-to-noise ratio, small detector area, mechanical shuttering, low time resolution and low temperature of operation.

It is yet a further object of the present invention to provide apparatus for high-spatial-resolution, high-time-resolution diagnostic, radiation therapy and industrial x-ray imaging.

DESCRIPTION OF A PREFERRED EMBODIMENT OF THE INVENTION

Figure 1:
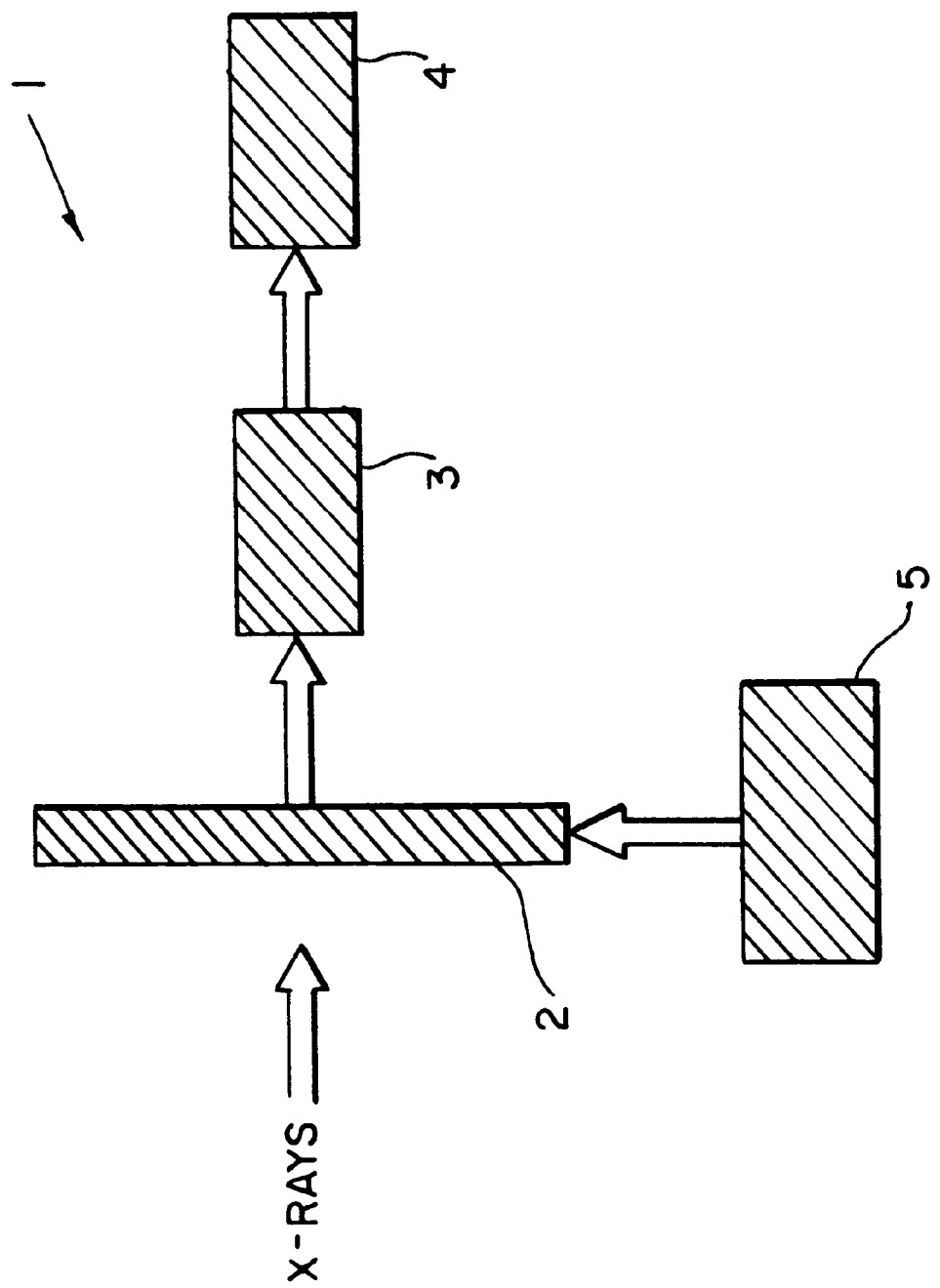
FIG. 1 is schematic representation of the major components of a high speed crystallography detector.
Figure 2A:
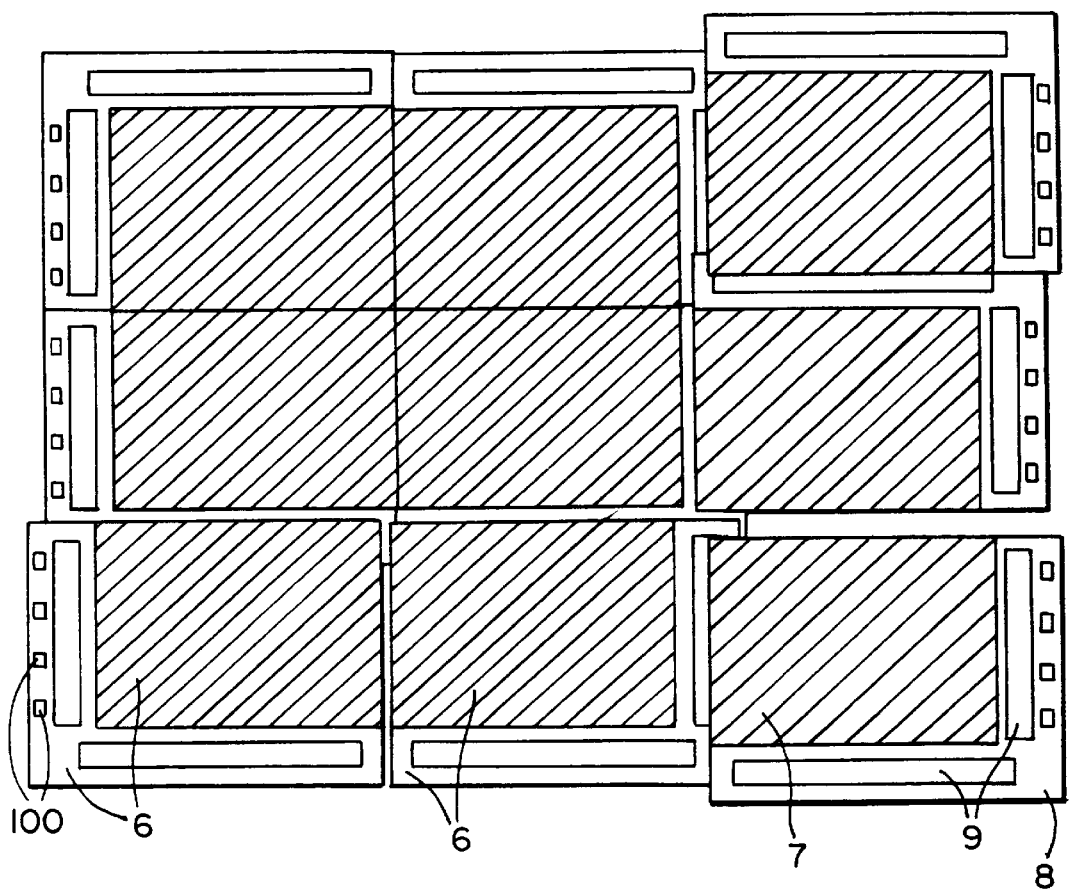
FIG. 2A is a top view of an area sensor of the present invention, excluding the support structure.

A preferred embodiment of the present invention is a high Detective Quantum Efficiency (DQE), high-speed, solid-state device, designed to sense and digitize diffraction data obtained by the passage of x-rays through a crystal. FIG. 1 is a block diagram of an embodiment of the invention, which is termed a High-Speed Crystallography Detector (HSCD) system 1. This system 1 is comprised of an area sensor 2, digitizing and output electronics 3, a data processor 4 and area-sensor drive electronics 5. FIG. 2A, a top view, and FIG. 2B, a side view, show in further detail the area sensor 2 of a preferred embodiment of the present invention. The area sensor 2 is comprised of multiple hybrids 6, comprised of detector array chips 7 hybridized to readout array chips 8 and arranged in a two or three dimensional configuration. Electrical connections are made to the readout array chip 8 by means of wire bond pads 100. The support structure is detailed in FIG. 2B and consists of a metal frame 101, circuit boards 103 to provide mechanical support and electrical connections to the readout array chips 8, and metal supports 102 for the circuit boards 103. The circuit boards provide electrical connections to the drive 5 and output electronics 3 by means of a cable 105 and provide electrical connections to the readout array chips 8 by means of wire bond pads 100 and wire bonds 104. For large sensor areas more than four hybrids 6 may be necessary. Because of the required peripheral readout circuitry 9 on the readout array chips 8, a three dimensional hybrid configuration is necessary to minimize regions as seen from above on the area sensor that have few or no detectors. For larger area sensors more than nine chips can be included in a three dimensional configuration. If K is the number (even) of hybrids in an area sensor row, then the number of three-dimension layers is approximately K–1.

In a preferred embodiment the hybrids 6 are 1–3 inches on a side, the detector array 7 and readout array chips 8 are electrically connected by indium bumps 10, and the three dimensional offset 11 is less than one centimeter.

Figure 3A:
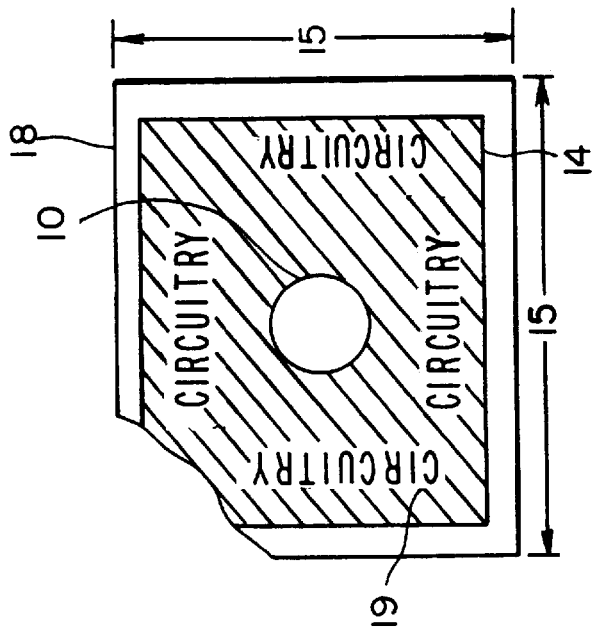
FIG. 3A is a top view of an x-ray shield indium bump pad of the present invention.
Figure 3:
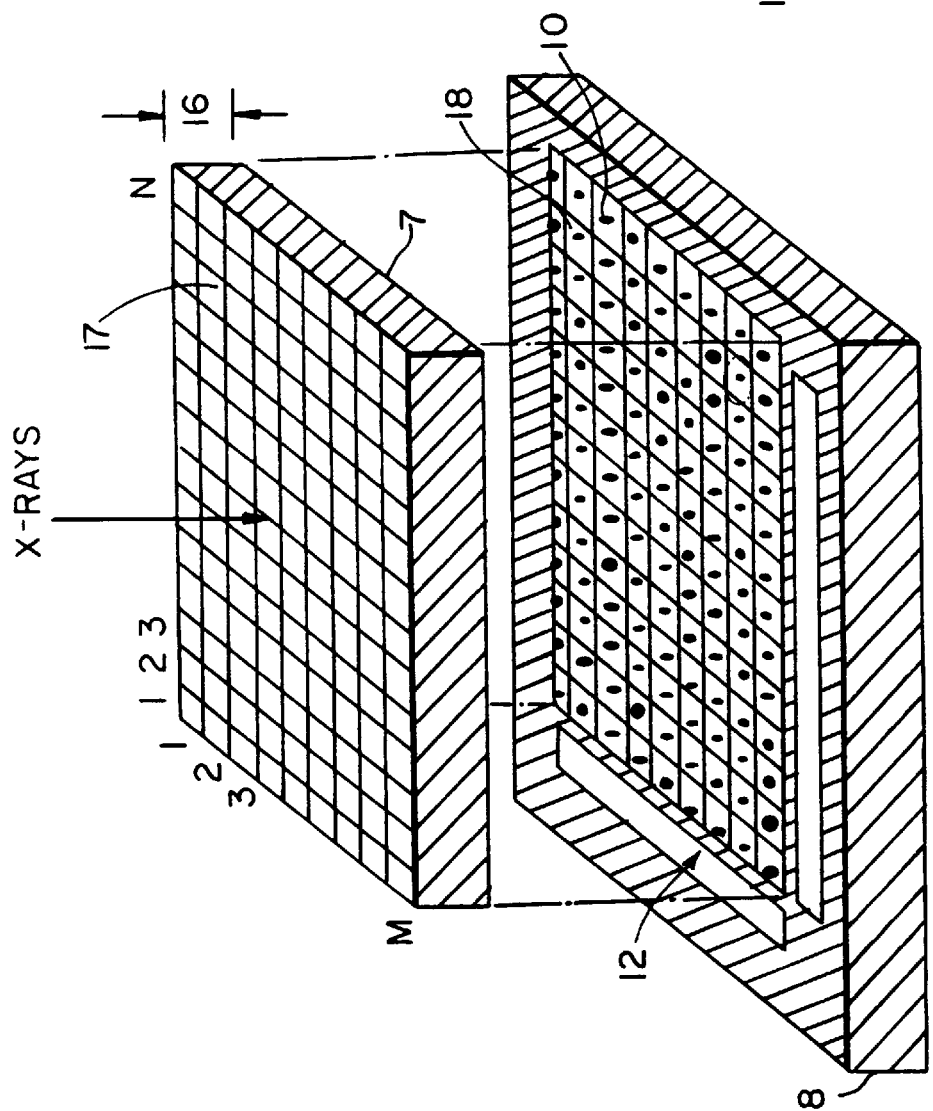
FIG. 3 is an exploded view of readout array chip and detector array chip of the present invention.

FIGS. 3 and 3A show in further detail the detector array chip 7 and readout array chip 8 of one hybrid 60 Each detector array chip 7 is comprised of an N×M array of individual detectors 17; each detector having a corresponding readout unit cell 18 on the readout array chip 8. The readout array chip 8 is further comprised of a row shift register 12, and column shift registers, multiplexer and output driver circuitry 13. Collectively the row shift register, column shift registers, multiplexer and output driver are referred to as the peripheral readout circuitry 9. Each readout unit cell 18 is further comprised of an x-ray shield/indium bump pad 14 on its upper surface, which electrically connects the indium bump 10 to the readout unit cell circuitry 19 located directly under the x-ray shield/indium bump pad 14. A corresponding x-ray shield/indium bump pad (not shown) on the underside of each detector 17 electrically connects the indium bump 10 to the detector, In a preferred embodiment the detector thickness 16 is a fraction of an x-ray absorption length to many x-ray absorption lengths and the linear dimension of the readout unit cell 15 is 25 to 500 microns. Absorption lengths are material dependent. With a silicon detector, for example, the absorption lengths for 8 and 12 KeV x-rays are about 55 $\mu$m and 150 $\mu$m respectively The preferred thickness of the x-ray shield/indium bump pad 14 is the x-ray stopping power equivalent of 1–30 microns of gold.

Figure 4:
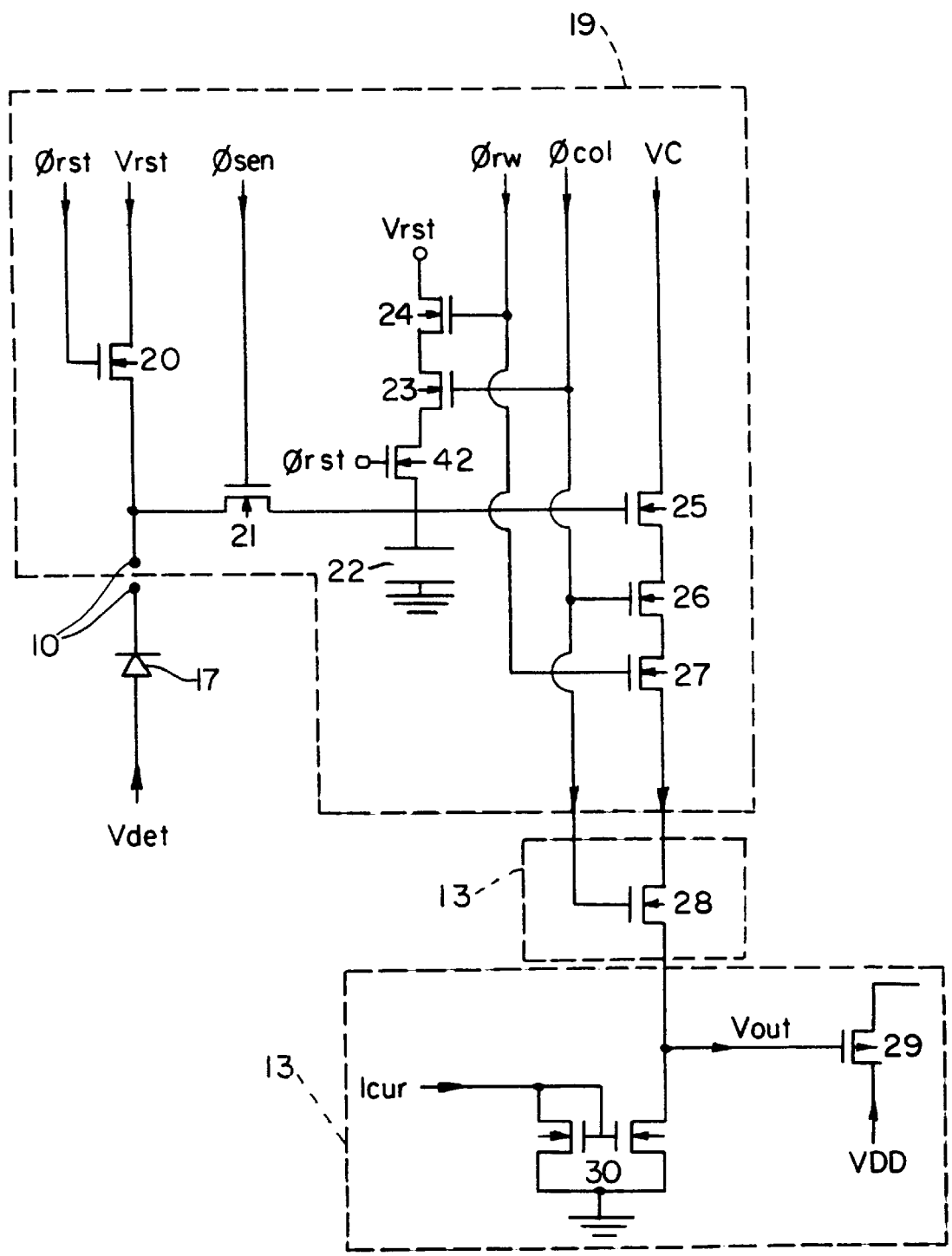
FIG. 4 is a schematic diagram of the circuit design for a continuous readout unit cell embodiment of the present invention.

FIG. 4 shows the continuous-readout unit-cell circuit design 19 as well as some of the peripheral circuitry 9 (FIG. 2A), a column multiplexer 28, (one for each column), a column load 30 (one for each chip) and an output driver 29 (one for each chip).

Figure 5:
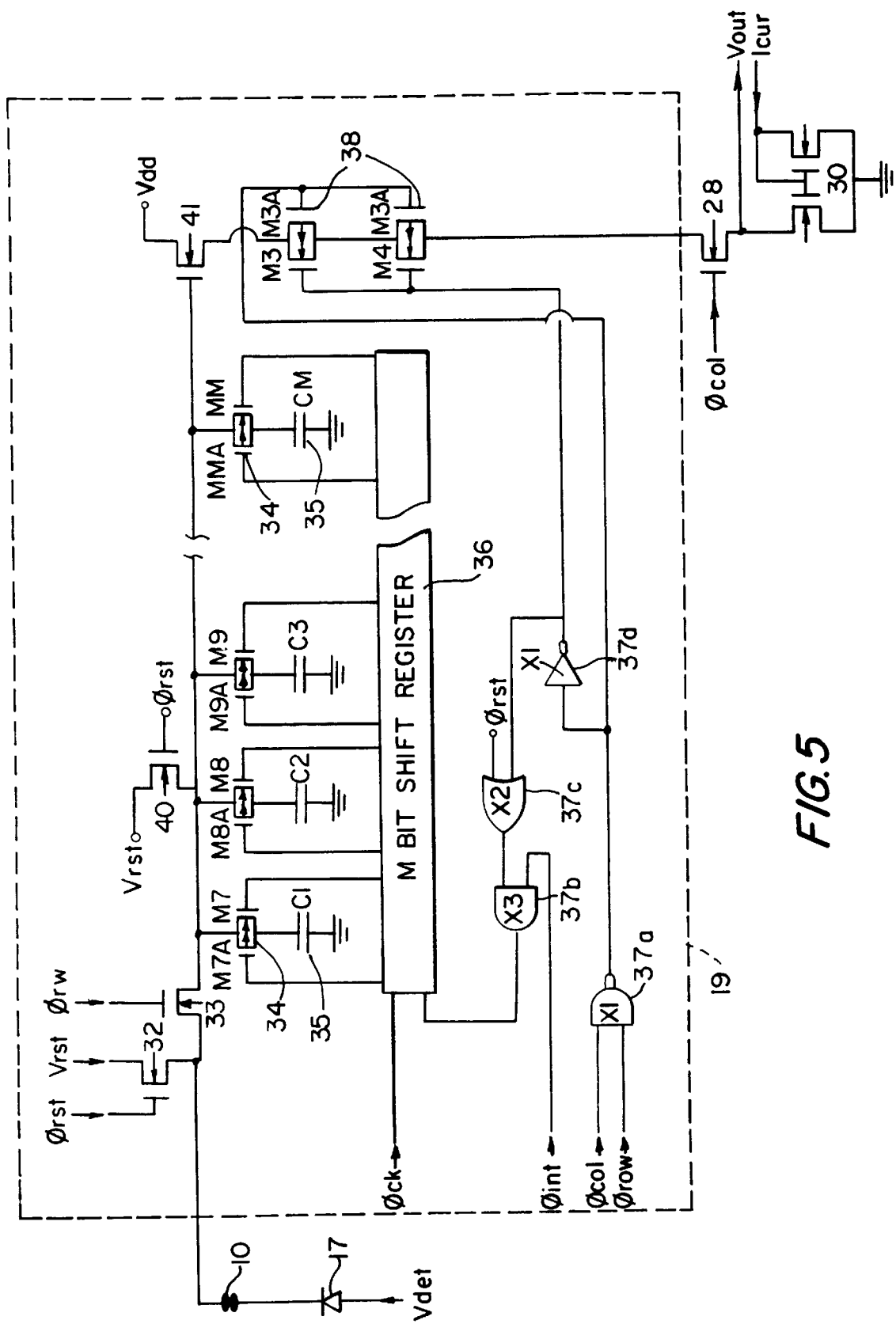
FIG. 5 is a schematic diagram of the circuit design for a high time resolution embodiment of the present invention.

The continuous readout unit cell circuitry 19 is comprised of an integration reset transistor 20, a sense capacitor switch transistor 21, connecting the detector 17 to the integration capacitor 22, column readout reset switch transistor 23, and row readout reset switch transistor 24, connecting the reset voltage (Vrst) to the sense capacitor 22. The sense capacitor is connected to the output driver 29 by means of a source follower 25, with column load 30, a row select switch transistor 27, a column select switch transistor 26 and the column multiplexer switch 28. The operation of this circuit will be described below in some detail FIG. 5 shows an alternative embodiment for a high time-resolution storage-readout unit cell circuitry 19. Here the detector 17 signals are sequentially connected into M different storage capacitors 35 by means of the MOSFET switch 33 and the N analog switches 34, associated with each storage capacitor 35. The M bit high-speed shift register 36 selects the particular analog switch 35, sequentially via external pulses. Logic gates 37a–d, via external pulses, can reset the shift register 36 and connect the storage capacitors 35 to the analog output source follower 41 during data readout Analog switches 38, connect the source follower to the output line (Vout) and chip current mirror load 30, via column multiplexer switch 28. MOSFET switches 32 and 40 are used for resetting the detector 17 during data accumulation. Only MOSFET reset switch 40 is used during data readout.

Figure 6:
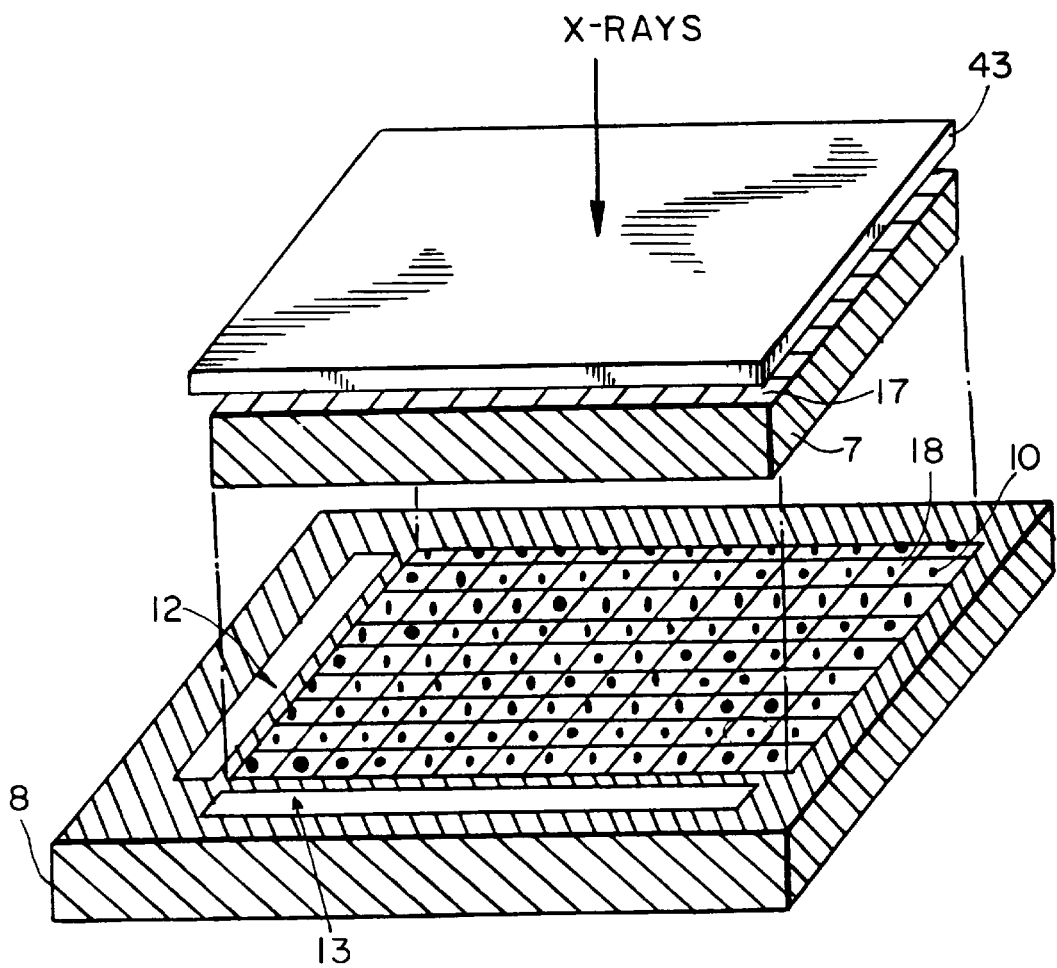
FIG. 6 is an exploded view of the readout array chip and detector array chip of the present invention in an embodiment where an x-ray quantum efficiency enhancement layer is located above the detector array chip.

FIG. 6 shows another preferred embodiment of the present invention. This embodiment is used for imaging x-rays with energies higher than those used in crystallography In this embodiment the hybrids are comprised of an x-ray quantum efficiency enhancement layer 43 comprising either a metal plate, a scintillator or phosphor layer on top of the detector array chip 7 which is indium bumped to the readout unit cell array chip 8. FIG. 6 differs from FIG. 3A by having the x-ray quantum-efficiency-enhancement layer 43.

The operation of the various preferred embodiments will now be described in some detail. In operation x-rays diffracted from a crystal are converted directly to electrical charge in the area sensor 2 (FIG. 1). The charge is sequentially read out of the pixels of the area sensor 2 by many output lines and clamp and sample circuitry in the output electronics 3. The clamp and sample circuitry may alternatively be included in the peripheral circuitry 9 (FIG. 2A). These pixels correspond to the detectors 17 of the detector array chip 7. The drive electronics 5 provides the clocks and biases for the area sensor read out. Pixel signals are digitized, conditioned and temporarily stored in the output electronics 3 and then transferred to the data processor 4 for molecular analysis. In the preferred embodiment of the present invention the number of output lines from the area sensor is greater or equal to the number of hybrids 6 (FIG. 2) making up the area sensor 2. Additionally in the preferred embodiment of the present invention there is a clamp and sample circuit and an analog to digital converter in the output electronics 3 for each output line.

X-rays diffracted from a crystal interact directly with the detector array chips 7 (FIGS. 2 and 3A) of the area sensor 2 (FIG. 1) producing a number of electron-hole pairs in each individual semiconductor detector 17. The number of electron-hole pairs is directly proportional to the energy of the x-ray (typically 1–30 kev in crystallography) and inversely proportional to the amount of energy required to produce an electron-hole pair in the solid-state detector material, e.g., a silicon PIN diode, (typically a few Ev). Thus a substantial gain or amplification results for even a single x-ray photons The charge (either electrons or holes) generated by the x-ray is conducted through the x-ray shield/indium bump pads 14 (FIG. 3), through the indium bump 10 and collected by an integration capacitor 22 (FIG. 4) or one of the storage capacitors 35 (FIG. 5) of a readout unit cell circuit. Features of the present invention which lead to superior performance are the direct interaction of the x-rays with the solid state detector 17, the large quantum efficiency of the interaction, the large amplification of the interaction, the direct collection of the charge, without loss, on a storage capacitor 22, FIGS. 4, 35, FIG. 5, and the large capacitance of a specifically fabricated capacitor on a separate readout chip. This superior performance is manifested in a high, single-photon signal-to-noise ratio at room temperature operation.

UNIQUE ADVANTAGES

The intermediate visible photons that are usual in current CCD-based crystallography detector designs are unnecessary in the present invention. The present invention therefore eliminates the DQE degrading phosphor noise and phosphor resolution degradation, as well as eliminating fiber-optic coupler losses and distortion.

Figure 2B:
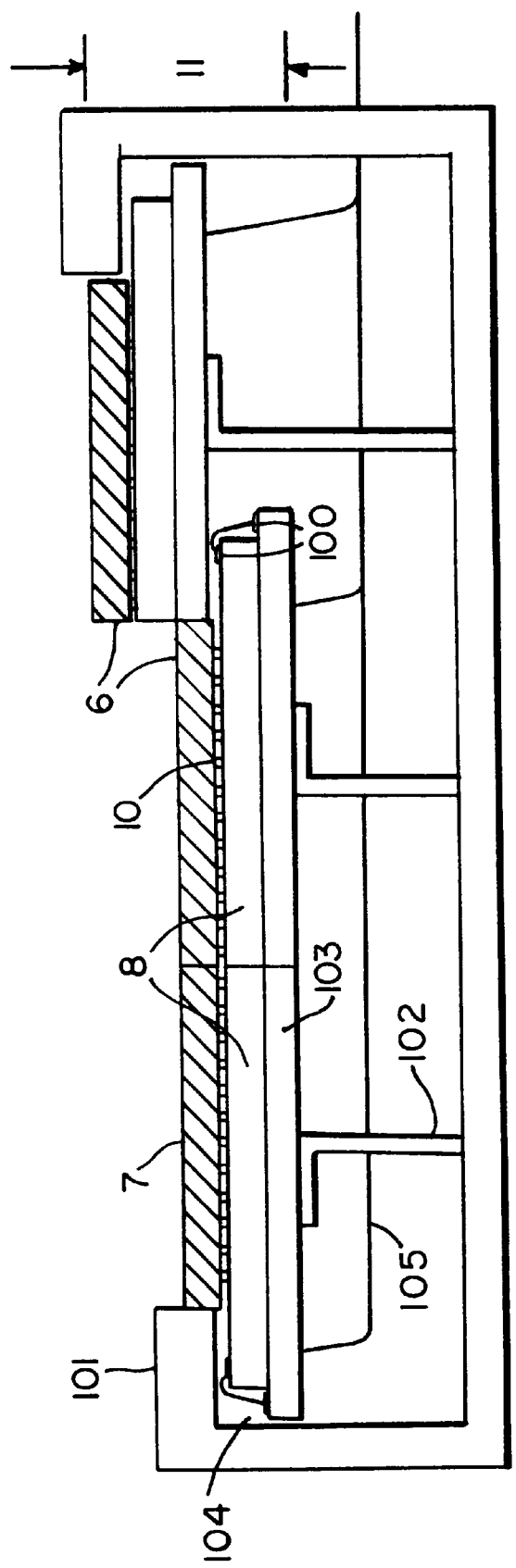
FIG. 2B is a side view of an area sensor of the present invention, including the support structure.

A desirable feature for a crystallography detector is a large x-ray collection area. FIG. 2 shows how a large collection area can be made of many hybrids 6 by means of a three-dimensional configuration. Collection areas of four or fewer hybrids do not require a three-dimensional configuration. Since the x-rays are not focused, the collection area does not have to be planar. To reduce the exposed inactive hybrid area resulting from the peripheral circuitry 9 on the readout array chips 8 (FIG. 2), the active area of an upper hybrid covers the inactive area of a lower hybrid. In this way the active sensor area can be made arbitrarily large with a minimum non-detecting space. If pixels are non-functional, the modular hybrid construction also allows simple replacement of a module rather than the whole area sensor. The peripheral circuitry at the edge of the area sensor 2 will be shielded from the x-rays by the area sensor support frame 101 (FIG. 2B). Peripheral circuitry interior to area sensor 2 may be shielded by the equivalent of 30 microns of gold placed on the underside (not shown) of upper level readout chips in the three dimensional array X-rays are damaging to circuit components and may therefore reduce the lifetime of the area sensor. The preferred construction of the peripheral 9 and readout unit cell circuitry is radiation-hard Complementary Metal Oxide Semiconductor (CMOS). Ordinary CMOS may suffice when used with adequate shielding The indium bump pads 14 when made thicker than normal, of high atomic number material, will shield the readout unit cell circuitry 19; peripheral circuitry 9 on hybrids 6 below other hybrids will also be substantially shielded. Even with radiation-hard CMOS, thick, high atomic number, radiation-shielding indium bump pads 14 are preferred.

There are two crystallography applications for the present invention which require two different readout unit cell circuits and correspondingly two different digitizing and output electronics 3 and two different area sensor drive electronics 5 (FIG. 1). The first readout unit cell circuit 19 shown in FIG. 4 supports the majority of current crystallography applications. The readout chip 8 (FIGS. 2 and 3) using the FIG. 4 circuit is designed for continuous integration and readout, with integration times greater than or equal to 1 ms. The integration cycle of each unit cell readout circuit 19 in the readout chip array 7 is offset in time so that integration proceeds on all the unit cells except the one being read out. The shortest integration time is defined by the number of pixels in the array, multiplied by the readout time per pixel, divided by the number of outputs per readout chip array. There is no dead time as there is on mechanical-shutter CCD designs where integration is terminated over the whole array while the data is being read out.

The operation of the FIG. 4 unit cell readout circuit, for continuous integration is now discussed. Switch 20 is off and switch 21 is on during the continuous integration. At the end of an integration cycle, the drive electronics 5 (FIG. 1) generates column and row select pulses $\phi$ col and $\phi$ rw which turn on switches 26 and 27 connecting the source follower 25 to the output driver 29, via the column select multiplexer switch 28, which has also been turned on by $\phi$ col from the drive electronics 5. Column multiplexer switch 28 prevents the source follower from driving the capacitance of all the column lines; only one column line is driven. Once the signal has been clamped by a delta reset circuit (not shown) in the output electronics 3 (FIG. 1) or in the peripheral circuitry 9 (FIG. 2A) the integration capacitor is reset by pulsing transistor 42. Sampling then subtracts the signal from the capacitor reset voltage; the difference in Vout is proportional to the charge collected during the integration cycle. Switches 26, 27, 23, 24, and 28 are then turned off by the drive electronics 5 and the new integration cycle begins; the next unit cell in the array is then selected for read out.

The FIG. 4 circuit also allows a "snapshot" operational mode in which one frame of data can be acquired with a much shorter integration time than the continuous integration mode. In the snapshot mode of operation transistor 21 disconnects the detector 17 from the integration capacitor 22 at the end of the integration cycle in all unit cells. This is effected by the drive electronics 5 (FIG. 1) when the pulse $\phi$sen goes low. Readout of the data proceeds as described for continuous integration except that a new integration cycle is not begun until all the unit cell data is read out. When all the data has been read out, switches 20 and 21 are turned on and the detector 17 is reset. When switch 20 is turned off, the new integration cycle begins for all unit cells at once. Because the integration cycle is begun and terminated for all the unit cells on the array at one time, the snapshot mods can accommodate a shorter integration time than the continuous integration mode. However, only one short-integration-time frame is possible. The FIG. 5 unit cell design allows multiple, consecutive, short-integration-time frames to be acquired. In effect it allows an uninterrupted series of snapshots.

The FIG. 5 unit cell readout circuit is used for high time resolution when the integration time is approximately between 1 ns and 1 ms. Under these circumstances the data from the FIG. 4 unit cell circuit cannot be read out fast enough to adequately time resolve the reaction under study and the analog data must be stored in the array for readout at a later time. Because the time required to switch between capacitors, in parallel in each unit cell, is very small in comparison to the readout time, the FIG. 5 circuit can be used for high time resolution studies. Integration starts on the C1 capacitor 35 (FIG. 5) in all unit cells. At the end of the first integration period the detector 17 output is switched to capacitor C2 35 and so on. After all the capacitors to CM 35 have accumulated data the integration terminates and readout begins. During readout no data is collected. After readout of all the storage capacitor data, integration can begin again.

The high time resolution readout circuit 19 (FIG. 5) functions as follows: The $\phi$ rw (read/writs) pulse is set high (write) and a high $\phi$ int pulse is sent from the drive electronics (FIG. 1). A high on OR gate 37c transmits a high to AND gate 37b which together with the high $\phi$ int transmits a high to the shift register 36, resetting it to ground or off state, deselecting all storage capacitors. $\phi$ int then goes low. $\phi$ rw stays high during the entire data taking operation and connects the detector 17 to the storage capacitor line by turning on MOSFET switch 33. The high time resolution readout circuit 19 (FIG. 5) is activated by clocking the shift register 36, with clocking pulses $\phi$ ck thereby shifting a logical one in the first bit of the shift register. This action selects the first capacitor C1 35 in the memory bank by turning on both switches M7 and M7A 34. Each cell in the memory bank is made up of a capacitor 35 that is disc charged by electrons collected by the detector 17. The selected capacitor is first reset to the predetermined value Vrst by the drive electronics 5 reset pulse, rst, before detector signal integration can occur. The detector 17, and the storage capacitor it is currently connected to, is reset by turning on MOSFET switch 32. This transistor has a large gate width to length ratio for low resistance in order to rapidly charge the detector and storage capacitor capacitance in a few nanosecond or less.

The period following the reset pulse is the integration time associated with the selected storage capacitors No matter what the photon flux on the detector 17, integration does not proceed until the reset switch 32 is off. The integration period is terminated by deselecting the current memory capacitor C1 35 and selecting the next memory capacitor C2 35 by pulsing the shift resister 36. The above described reset and integration process is repeated for all memory capacitors All acquired data is now stored in the capacitors and must be read out. At the end of the last integration period, the shift register is again initialized to the ground state thereby deselecting all storage capacitors The read/write pulse ϕ rw then goes low disconnecting the detector 17 from the memory cells in preparation for the readout memory cycles. In this way any events occurring at the detector 17 will not affect the data being read out.

The unit cell readout cycles start by first selecting a row and column unit cell address via pulses ϕ col and ϕ row. Once a unit cell is selected the NAND gate 37a transfers a low to invertor 37d and turns on the PMOS side of output line (Vout) analog switches 38. The high from the invertor turns on the NMOS side of the output line analog switches 38 and the source follower 41 is enabled. ϕ col also turns on switch 28 so that only one column line is driven. The read memory cycle is initiated by selecting the first memory cell C1 35 by clocking ϕ ck thereby shifting a logical one into the shift resister. This action turns on switches M7 and M7A 34 thereby connecting capacitor C1 35 to the source follower 41. The voltage on the selected capacitor is clamped by the delta reset circuitry in the output electronics 3 (FIG. 1). The selected memory capacitor is then reset to its previous value the reset value, Vrst—and its voltage is sampled again by the delta reset circuitry. The difference in the output voltage Vout shortly before and after reset is proportional to the charge collected during the particular integration period that the capacitor was discharged. The next sequential memory capacitor is selected by pulsing the clock line ϕ ck thereby sequencing the shift resister This process is repeated for all storage capacitors, C2 to CM in the unit cell. The next unit cell is selected by the proper selection of row and column address and the process is repeated as before until all data in each unit cell is read out.

Although the main application of the present invention is an integrating detector where many photons are collected per pixel during an integration cycle it can be used as an energy-discriminating particle counter. In this embodiment of the present invention the photon flux on the area sensor 2 is low enough, and the integration period is short enough, so that only one photon per pixel per integration period is collected. The detector signal is then proportional to the x-ray energy.

Another embodiment of the present invention is as a high-spatial resolution, large area sensor for x-ray medical diagnostic imaging (x-rays from 25 kev to 120 kev) radiation therapy imaging (x-rays from 1 MeV to 20 MeV) or industrial imaging. For x-ray energies higher than those used in crystallography, an additional layer 43, FIG. 6 may be necessary to increase the x-ray quantum efficiency. In the diagnostic imaging embodiment a scintillator or phosphor layer 43 in contact with the detector array 7 (FIG. 6) may be used to couple the x-rays to the area sensor 2; the phosphor or scintillator 43 would detect some or all of the x-rays, converting them to visible light photons which are then collected by the detector array 7 through conversion to electron-hole pairs.

In the radiation therapy embodiment a tungsten metal plate or other material layer 43 (FIG. 6) would be in contact with the detector array 7, converting the high-energy x-rays to electrons. The electrons would then be collected by the detector array through conversion to electron-hole pairs. In the hybrid configuration of FIG. 6 high spatial resolution is achieved 14 because the unit cell 18 containing the readout circuitry 19 is under the detector 17 and not along side of it as in monolithic chip designs. In this way the detector 17 area is not traded off against readout circuitry 19 area and pixel size is minimized.

Although detailed embodiments of the present invention have been provided for macromolecular crystallographic x-ray analysis, the present invention is not limited to only those embodiments but also includes uses and adaptations that would be equivalent to those defined in the following claims.

We claim:

1. A method for the continuous integration and readout of the intensity of a source of x-rays or light striking an area sensor comprising the following steps:

a) exposing an area sensor to the source of x-rays or light, said area sensor comprised of a plurality of detector-array chips, each detector-array chip comprising a plurality of detectors and each array chip being coupled to corresponding readout array chips, each readout array chip comprised of a plurality of unit cells, where a unit cell of each readout array chip is coupled to a corresponding detector in the detector array chip, wherein signals are formed in each of the plurality of detectors indicative of the intensity of the source of x-rays or light exposing said detector, b) integrating the signal from each of the plurality of detectors on one or more storage means in the corresponding unit cell of the readout-array chip, c) timing the integration for continuous integration and readout, d) reading out the integrated signal from each unit cell of the readout array, continuously and consecutively, wherein all unit cells are read out in one integration time and there is no dead time between integration times.

2. The method of claim 1, wherein said integrating step is accomplished by storing charge on a capacitor.

3. The method of claim 1, wherein the step of reading out the integrated signal from each unit cell is performed on a plurality of output lines, each output line at any one time reading out a single unit cell and each unit cell being read by only one output line, said step of reading out further comprising the step of resetting said unit cell and commencing integration in the unit cell once its read out is complete.

4. The method of claim 1 wherein said detector array chips are first coupled to said readout array chips by metal bumps to form hybrids.

5. The method of claim 4 wherein said area sensor is formed during manufacture by a three dimensional array of said hybrids whose active areas are not shadowed by other hybrids in the array.

6. The method of claim 1 wherein timing pulses and biases are provided to said readout-array chips.

7. The method of claim 1 comprising the additional step of converting the signals formed on said detectors to digital signals and storing the digital signals.

8. The method of claim 1 comprising the additional steps of converting the signals formed on said detectors to digital signals, storing the digital signals, numerically manipulating the digital signals and displaying the manipulated signals for visual review.

9. The method of claim 1 wherein said step for exposing the area sensor to x-rays or light is performed by converting the x-rays or light from the source into emitted electrons and receiving the electrons at said area sensor.

10. The method of claim 9 wherein said area sensor and said detector array chips are coupled to said readout array chips by metal bumps to form hybrids.

11. The method of claim 10 wherein said area sensor is formed by a three dimensional array of said hybrids whose active areas are not shadowed by other hybrids in the array.

12. The method of claim 9 wherein timing pulses and biases are provided to said readout-array chips.

13. The method of claim 9 wherein the signals formed on said detectors are converted to digital signals and stored as digital signals.

14. The method of claim 13 wherein said digital signals are accessed, numerically manipulated and displayed for visual review.

15. The method of claim 1 wherein said step for exposing the area sensor to x-rays is performed by converting the x-rays from the source into emitted light and receiving the light at said area sensor.

16. A method for the readout at discrete times of data indicative of the intensity of a source of x-rays or light striking an area sensor comprising the following steps:

a) exposing an area sensor to the source of x-rays or light, said area sensor comprised of one or more detector-array chips, each detector-array chip comprising a plurality of detectors and each array chip being coupled to corresponding readout array chips, each readout array chip comprised of a plurality of unit cells, where a unit cell of each readout array chip is coupled to a corresponding detector in the detector array chip, wherein signals are formed in each of the plurality of detectors indicative of the intensity of the source of x-rays or light exposing said detector, b) integrating the signal from each of the plurality of detectors on one of a plurality of storage means in the corresponding unit cell of the readout-array chip, to obtain readouts at one or a plurality of discrete times, c) switching the signal to a next storage means in the unit cell, if it is available, and again integrating the signal, d) repeating the process step c) until a predetermined set of the unit-cell storage means are filled with data, e) terminating the signal integration and f) reading out the data.

17. The method of claim 16, wherein said integrating step is accomplished by storing charge on a capacitor.

18. The method of claim 16, wherein the step of reading out the integrated signal from each unit call is performed on a plurality of output lines, each output line at any one time reading out a single unit cell and each unit cell being read by only one output line, said step of reading out further comprising the step of resetting said unit cell and commencing integration in the unit cell once its read out is complete.

19. The method of claim 16 wherein said detector array chips are first coupled to said readout array chips by metal bumps to form hybrids.

20. The method of claim 19 wherein said area sensor is formed during manufacture by a three dimensional array of said hybrids whose active areas are not shadowed by other hybrids in the array.

21. The method of claim 16 wherein timing pulses and biases are provided to said readout-array chips.

22. The method of claim 16 comprising the additional step of converting the signals formed on said detectors to digital signals and storing the digital signals.

23. The method of claim 22 wherein said step for exposing the area sensor to x-rays or light is performed by converting the x-rays or light from the source to emitted electrons and receiving the electrons at said area sensor and said digital signals are accessed, numerically manipulated and displayed for visual review.

24. The method of claim 16 comprising the additional steps of converting the signals formed on said detectors to digital signals, storing the digital signals, numerically manipulating the digital signals and displaying the manipulated signals for visual review.

25. The method of claim 16 wherein said step for exposing the area sensor to x-rays or light is performed by converting the x-rays or light from the source to emitted electrons and receiving the electrons at said area sensor.

26. The method of claim 25 wherein said area sensor and said detector array chips are coupled to said readout array chips by metal bumps to form hybrids.

27. The method of claim 26 wherein said area sensor is formed by a three dimensional array of said hybrids whose active areas are not shadowed by other hybrids in the array.

28. The method of claim 25 wherein timing pulses and biases are provided to said readout-array chips.

29. The method of claim 25 wherein the signals formed on said detectors are converted to digital signals and stored as digital signals.

30. The method of claim 16 wherein said step for exposing the area sensor to x-rays is performed by converting the x-rays from the source to emitted light and receiving the emitted light at said area sensor.

* * * * *